(12) United States Patent
Visser et al.

(10) Patent No.: US 11,094,316 B2
(45) Date of Patent: Aug. 17, 2021

(54) AUDIO ANALYTICS FOR NATURAL LANGUAGE PROCESSING

(71) Applicant: QUALCOMM Incorporated, San Diego, CA (US)

(72) Inventors: Erik Visser, San Diego, CA (US); Fatemeh Saki, San Diego, CA (US); Yinyi Guo, San Diego, CA (US); Sunkuk Moon, San Diego, CA (US); Lae-Hoon Kim, San Diego, CA (US); Ravi Choudhary, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 15/972,011

(22) Filed: May 4, 2018

(65) Prior Publication Data

US 2019/0341026 A1 Nov. 7, 2019

(51) Int. Cl.
*G06F 3/16* (2006.01)
*G10L 15/18* (2013.01)
(Continued)

(52) U.S. Cl.
CPC .......... *G10L 15/1807* (2013.01); *G06F 3/167* (2013.01); *G10L 15/1815* (2013.01);
(Continued)

(58) Field of Classification Search
CPC . G10L 15/1815; G10L 15/1807; G10L 25/63; G10L 15/20; G06F 3/167
See application file for complete search history.

(56) References Cited

U.S. PATENT DOCUMENTS 4,827,521 A * 5/1989 Bahl ....................... G10L 15/14
704/240
8,463,648 B1 * 6/2013 Bierner .................. G06Q 30/02
705/14.44
(Continued)

OTHER PUBLICATIONS

Barchiesi D., et al., "Acoustic Scene Classification", IEEE Signal Processing Magazine, May 2015, vol. 32, No. 3, pp. 16-34.
(Continued)

*Primary Examiner* — Daniel C Washburn
*Assistant Examiner* — Oluwadamilola M Ogunbiyi
(74) *Attorney, Agent, or Firm* — QUALCOMM Incorporated

(57) ABSTRACT

A device includes a memory configured to store category labels associated with categories of a natural language processing library. A processor is configured to analyze input audio data to generate a text string and to perform natural language processing on at least the text string to generate an output text string including an action associated with a first device, a speaker, a location, or a combination thereof. The processor is configured to compare the input audio data to audio data of the categories to determine whether the input audio data matches any of the categories and, in response to determining that the input audio data does not match any of the categories: create a new category label, associate the new category label with at least a portion of the output text string, update the categories with the new category label, and generate a notification indicating the new category label.

30 Claims, 6 Drawing Sheets

(51) Int. Cl.
  *G10L 15/22* (2006.01)
  *G10L 17/04* (2013.01)
  *G10L 25/63* (2013.01)
(52) U.S. Cl.
  CPC .............. *G10L 15/22* (2013.01); *G10L 17/04* (2013.01); *G10L 25/63* (2013.01)

(56) References Cited

U.S. PATENT DOCUMENTS

| | | | |
|---|---|---|---|
| 9,165,556 B1* | 10/2015 | Sugar | G10L 15/10 |
| 9,412,361 B1 | 8/2016 | Geramifard et al. | |
| 9,484,030 B1* | 11/2016 | Meaney | H04R 3/005 |
| 9,812,152 B2 | 11/2017 | Christian | |
| 10,026,401 B1* | 7/2018 | Mutagi | G10L 15/22 |
| 2003/0028384 A1* | 2/2003 | Kemp | G10L 17/26 |
| | | | 704/275 |
| 2004/0213419 A1* | 10/2004 | Varma | G10L 21/0264 |
| | | | 381/92 |
| 2005/0187770 A1 | 8/2005 | Kompe et al. | |
| 2007/0033005 A1* | 2/2007 | Cristo | G06F 17/279 |
| | | | 704/9 |
| 2007/0043574 A1* | 2/2007 | Coffman | G10L 15/22 |
| | | | 704/275 |
| 2007/0050191 A1* | 3/2007 | Weider | G10L 15/22 |
| | | | 704/275 |
| 2007/0183604 A1 | 8/2007 | Araki et al. | |
| 2008/0270127 A1* | 10/2008 | Kobayashi | G10L 15/065 |
| | | | 704/226 |
| 2009/0106022 A1* | 4/2009 | Madani | G06F 17/276 |
| | | | 704/232 |
| 2009/0198492 A1* | 8/2009 | Rempel | G10L 15/20 |
| | | | 704/233 |
| 2010/0142725 A1* | 6/2010 | Goldstein | H04R 29/00 |
| | | | 381/92 |
| 2011/0166856 A1* | 7/2011 | Lindahl | G10L 15/20 |
| | | | 704/233 |
| 2011/0173539 A1* | 7/2011 | Rottler | G06F 3/0482 |
| | | | 715/727 |
| 2012/0089396 A1* | 4/2012 | Patel | G10L 25/00 |
| | | | 704/249 |
| 2014/0074466 A1* | 3/2014 | Sharifi | G10L 15/08 |
| | | | 704/235 |
| 2014/0161270 A1* | 6/2014 | Peters | G10L 25/51 |
| | | | 381/63 |
| 2015/0012267 A1* | 1/2015 | Rill | G10L 15/20 |
| | | | 704/233 |
| 2015/0066479 A1* | 3/2015 | Pasupalak | G06F 17/27 |
| | | | 704/9 |
| 2015/0081287 A1* | 3/2015 | Elfenbein | G10L 21/0208 |
| | | | 704/226 |
| 2015/0213119 A1* | 7/2015 | Agarwal | G06F 16/355 |
| | | | 707/737 |
| 2015/0365759 A1* | 12/2015 | Dimitriadis | G06K 9/00684 |
| | | | 381/71.1 |
| 2016/0012020 A1* | 1/2016 | George | G06F 17/2785 |
| | | | 704/9 |
| 2016/0176309 A1* | 6/2016 | Jeon | B60L 58/12 |
| | | | 701/22 |
| 2016/0225389 A1* | 8/2016 | Jinnai | G10L 25/51 |
| 2016/0259775 A1* | 9/2016 | Gelfenbeyn | G06F 17/279 |
| 2016/0316293 A1* | 10/2016 | Klimanis | H04R 3/00 |
| 2017/0076727 A1 | 3/2017 | Ding et al. | |
| 2017/0116986 A1 | 4/2017 | Weng et al. | |
| 2017/0124818 A1* | 5/2017 | Ullrich | G06F 3/167 |
| 2017/0154176 A1* | 6/2017 | Yun | G06F 3/167 |
| 2017/0263266 A1* | 9/2017 | Henrique Barbosa Postal | H04R 29/00 |
| 2017/0270919 A1* | 9/2017 | Parthasarathi | G10L 15/16 |
| 2017/0278514 A1* | 9/2017 | Mathias | G10L 15/22 |
| 2017/0323643 A1* | 11/2017 | Arslan | G10L 17/005 |
| 2017/0325023 A1* | 11/2017 | Nongpiur | H04R 3/005 |
| 2018/0047387 A1* | 2/2018 | Nir | G10L 15/05 |
| 2018/0053518 A1* | 2/2018 | Chrisman | G10L 25/84 |
| 2018/0096690 A1* | 4/2018 | Mixter | G06F 3/167 |
| 2018/0121034 A1* | 5/2018 | Baker | G06F 3/0482 |
| 2018/0144615 A1* | 5/2018 | Kinney | G06K 9/00362 |
| 2018/0150897 A1* | 5/2018 | Wang | G06Q 30/0631 |
| 2019/0050875 A1* | 2/2019 | McCord | G06Q 30/0201 |
| 2019/0066693 A1* | 2/2019 | Ziv | G10L 17/02 |
| 2019/0080710 A1* | 3/2019 | Zhang | G10L 21/0264 |
| 2019/0130910 A1* | 5/2019 | Kariya | G10L 15/02 |
| 2019/0171409 A1* | 6/2019 | Boulanger | H04H 60/59 |
| 2019/0205395 A1* | 7/2019 | Bonin | G06F 17/28 |

OTHER PUBLICATIONS

Tax D.M.J., et al., "Support Vector Domain Description", Pattern Recognition Letters 20, Elsevier, 1999, pp. 1191-1199.
Yang E., et al., "Mitigating User Frustration through Adaptive Feedback Based on Human Automation Etiquette Strategies", Industrial Engineering, Iowa State University, 2016, 195 Pages.
International Search Report and Written Opinion—PCT/US2019/030471—ISA/EPO—dated Jul. 23, 2019.
Krsmanovic F., et al., "Have we met? MDP Based Speaker ID for Robot Dialogue", Proceedings of Interspeech 2006, Sep. 17, 2006, XP055117559, table 3, section 2, 4 pages.

* cited by examiner

AUDIO ANALYTICS FOR NATURAL LANGUAGE PROCESSING

I. FIELD

The present disclosure is generally related to performing audio analytics and natural language processing.

II. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Smart speaker systems are capable of receiving spoken commands from a user and performing an action based on the command. For example, the user may speak the command "play music on the living room speaker." The smart speaker may perform natural language processing (NLP) on the user speech (or a text string based on the user speech) to identify the action to be performed. However, the natural language processing only analyzes the words spoken by the user. Unless a user utters all clues or cues needed for the NLP to determine the action to be performed, the NLP system may be unable to determine the action and thus to provide an accurate response to a user command.

III. SUMMARY

In a particular aspect, a device includes a memory configured to store one or more category labels associated with one or more categories of a natural language processing library. The device also includes a processor coupled to the memory and configured to analyze input audio data to generate a text string and to perform natural language processing on at least the text string to generate an output text string including an action associated with at least one of a first device, a speaker, a location, or a combination thereof. The processor is configured to compare the input audio data to audio data of one or more categories to determine whether the input audio data matches any of the one or more categories and, in response to determining that the input audio data does not match any of the one or more categories: create a new category label, associate the new category label with at least a portion of the output text string, update the one or more categories with the new category label, and generate a notification indicating the new category label.

In another particular aspect, a method for performing audio analytics includes analyzing, at a processor, input audio data to generate a text string. The method includes performing natural language processing on at least the text string to generate an output text string comprising an action associated with at least one of a device, a speaker, a location, or a combination thereof. The method includes comparing the input audio data to audio data of one or more categories of a natural language processing library stored at a memory to determine that the input audio data does not match any of the one or more categories. The method further includes, in response to the input audio data not matching any of the one or more categories, creating a new category label, associating the new category label with at least a portion of the output text string, updating the one or more categories with the new category label, and generating a notification indicating the new category label.

In another particular aspect, an apparatus includes means storing one or more category labels associated with one or more categories of a natural language processing library. The apparatus also includes means for processing, the means for processing configured to analyze input audio data to generate a text string and to perform natural language processing on at least the text string to generate an output text string including an action associated with at least one of a first device, a speaker, a location, or a combination thereof. The means for processing is configured to compare the input audio data to audio data of one or more categories to determine whether the input audio data matches any of the one or more categories. The means for processing is further configured to, in response to determining that the input audio data does not match any of the one or more categories: create a new category label, associate the new category label with at least a portion of the output text string, update the one or more categories with the new category label, and generate a notification indicating the new category label.

In another particular aspect, a non-transitory computer readable medium stores instructions that, when executed by a processor, cause the processor to perform operations including analyzing input audio data to generate a text string. The operations include performing natural language processing on at least the text string to generate an output text string comprising an action associated with at least one of a device, a speaker, a location, or a combination thereof. The operations include comparing the input audio data to audio data of one or more categories of a natural language processing library to determine that the input audio data matches any of the one or more categories. The operations include, in response to determining that the input audio data does not match any of the one or more categories, creating a new category label, associating the new category label with at least a portion of the output text string, updating the one or more categories with the new category label, and generating a notification indicating the new category label.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
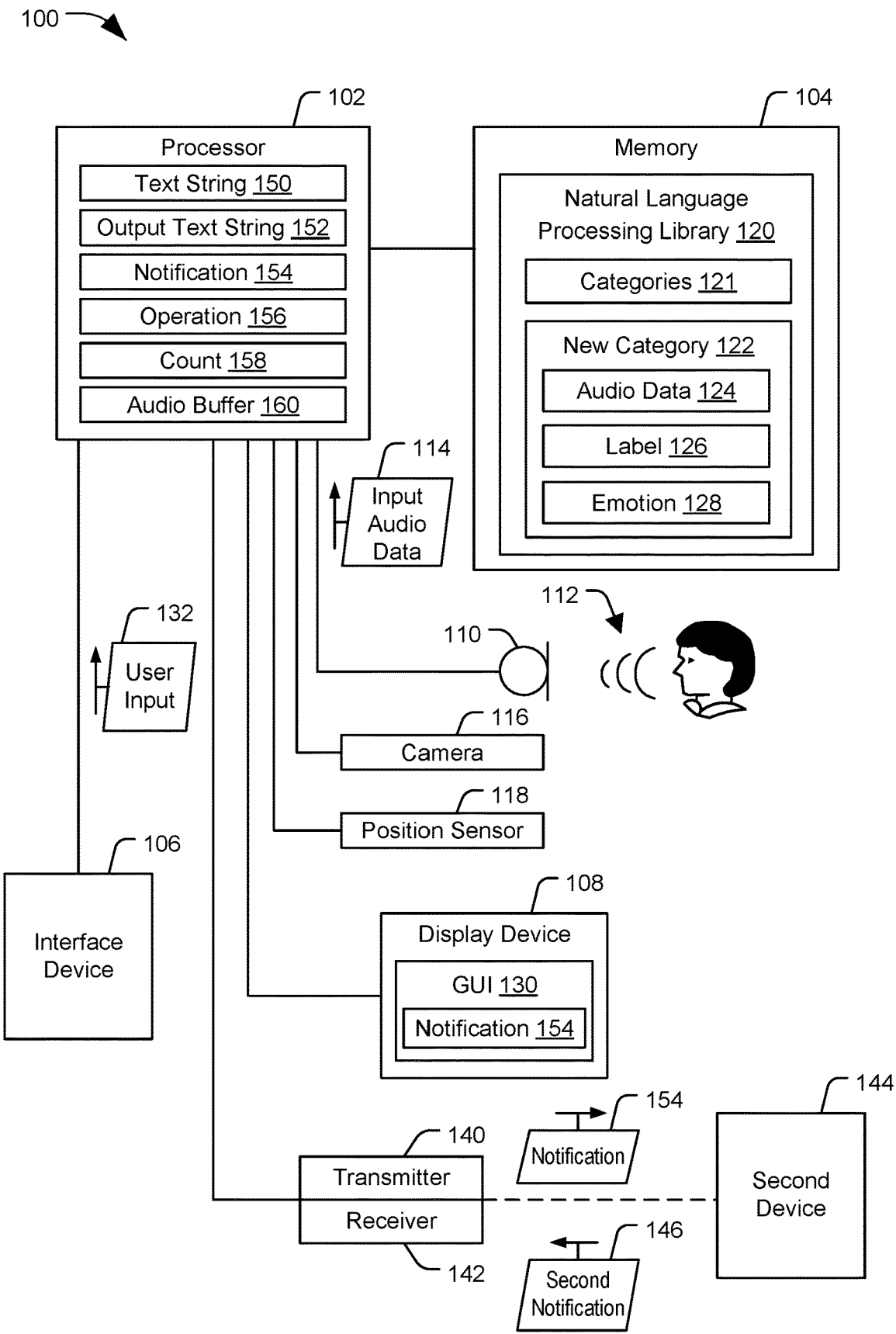
FIG. 1 is a block diagram of a particular illustrative aspect of a system that performs audio analytics.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Systems, devices, and methods for performing audio analytics are disclosed. A system of the present disclosure is configured to analyze audio including user speech to label particular sounds (e.g., acoustic environments, acoustic events, or people speaking) that are in the audio in addition to the user speech. The new sounds may be identified and categorized such that the next time the sound occurs, the sound may be identified as context information for future natural language processing. In a particular implementation, the system is integrated in a smart speaker system (e.g., a speaker within a user's home that is capable of playing audio, receiving spoken user commands, and performing actions based on the user commands). In other implementations, the system is integrated in a mobile device or in a vehicle.

To illustrate, a user may be in the kitchen using cutlery and speak the command "turn on the kitchen light." The system may receive audio data that corresponds to the user's speech (e.g., "turn on the kitchen light") and that corresponds to the sound of cutlery being used. The system may identify the user speech (e.g., a first portion of the audio data) as a command and may convert the user speech to a text string using automatic speech recognition. The system may perform natural language processing on the text string to identify an action corresponding to the speech, in addition to identifying other information within the command (such as a location, a device, or a person speaking, as non-limiting examples). Additionally, while the user speaks the command, the user may be using cutlery to cut food (e.g., the sound of a knife cutting may be detected). The system may detect the sound of cutlery (e.g., a second portion of the audio data) as a new, unknown sound. The system may use results of the natural language processing to identify the new sound. For example, the system may identify a device, a speaker (e.g., a person speaking), a location, or a combination thereof, using information contained in the text string. As a particular example, natural language processing of the text string "turn on the kitchen light" may result in "kitchen" being identified as a location. Based on the identification, the new sound may be categorized as "kitchen sounds." A new category may be generated and stored in a natural language processing library, the new category associating audio features from the audio data (e.g., the second portion of the audio data, corresponding to the sounds of cutlery being used) with the text label "kitchen sounds."

At a later time, second audio data including the cutlery sounds and user speech "turn on the light" may be received. The system may compare the second audio data to audio data stored in the natural language processing library to identify the cutlery sounds as "kitchen sounds." The text label "kitchen sounds" may be used as a contextual input to natural language processing of the speech "turn on the light." For example, a text string "the user is in the kitchen" may be provided in addition to the text string "turn on the light" for natural language processing. Based on the contextual input, the natural language processing may identify "turn on a light" as a command and may identify a location as the kitchen, and thus may cause the kitchen light to turn on. In this manner, the system improves an accuracy of a command (e.g., turn on the kitchen light, as opposed to turning on a different light) and improves a user experience (e.g., the user can utter more natural commands). Additionally, the system may generate a notification of the new category, which may be pushed to other devices that respond to audio commands. For example, the new category may be added to natural language processing libraries at smart appliances, Internet of Things (IoT) devices, mobile devices, additional smart speakers, or a combination thereof. Although identifying a particular sound has been described, techniques described herein can also be used to identify a speaker (e.g., a person speaking), as further described herein.

If a sound (or person speaking) cannot be identified based on natural language processing, the system may generate a prompt for the user to identify any unknown sounds. The prompt may be displayed on a display device or may be an audio prompt that is output to the user. In some implementations, the prompt is issued periodically instead of each time a new category is identified, so as not to burden the user with excessive requests. For example, after a particular amount of time (e.g., a day, a week, a month), the system may issue a request to identify any unknown sounds that have been logged by the system. The prompt may be displayed via a graphical user interface (GUI) or may be an audio prompt. In response to the prompt, the user may enter text (e.g., via a user input device) or may speak information that is converted to text labels for the sounds (or people speaking), and the text labels may be correlated to the sounds and stored as new categories in the natural language processing library.

In some implementations, the system may correlate categories in the natural language processing library with emotions. For example, the system may be configured to determine the emotion of a user based on user speech, based on image data, based on one or more sensor readings, or a combination thereof. As a particular example, the system may perform recognition of facial expressions in image data to determine the emotion. As another example, the emotion may be determined based on heart rate, body temperature, or other sensor inputs from one or more biometric sensors. As another example, energy, pitch, frequency, prosody, or another metric may be monitored in input audio data (e.g., user speech) to determine the emotion. The detected emotions may be correlated to particular sounds, particular commands, particular speakers (e.g., people speaking), or a combination thereof. Correlating emotions to various categories in the natural language processing library may enable the system to take one or more actions. To illustrate, a particular location (e.g., the grocery store) may be correlated with anxiety (or another negative emotion). When a user command is received that is associated with the particular location (e.g., "navigate me to the grocery store"), the system may issue a notification "The grocery store makes you anxious. It will likely be less crowded in an hour. Would you like to go then?" Alternatively, the system may initiate one or more remedial actions. For example, playing music may be correlated to happiness (based on detected emotions), and in response to receiving the command "navigate me to the grocery store", the system may turn on music in addition to providing directions to the grocery store. In this manner, a user experience may be improved due to correlation of detected emotions and other inputs. This may be especially helpful for people suffering from post-traumatic stress disorder or for the elderly, who may desire a device that takes into account their emotional state when performing operations.

Referring to FIG. 1, a system 100 includes a processor 102, a memory 104 coupled to the processor 102, a microphone 110, a transmitter 140, and a receiver 142. The system 100 may optionally include an interface device 106, a display device 108, a camera 116, and a position sensor 118. In a particular implementation, the system 100 is implemented in a smart speaker system (e.g. a wireless speaker and voice command device that is integrated with a virtual assistant). In another particular implementation, the system 100 is implemented in a mobile device, such as a mobile phone, a laptop computer, a tablet computer, a computerized watch, etc. In another particular implementation, the system 100 is implemented in one or more Internet of Things (IoT) devices or smart appliances, as non-limiting examples. In another particular implementation, the system 100 is implemented in a vehicle, such as an automobile or a self-driving vehicle, as non-limiting examples. In another particular implementation, the system 100 is integrated in a robot. The system 100 is configured to perform audio analytics for natural language processing to improve a user experience, as described in more detail below.

The processor 102 is configured to perform adaptive audio analytics on input sounds, as further described herein. The memory 104 is configured to store a natural language processing library 120 including one or more categories 121. Although the natural language processing library 120 is illustrated as being stored at the memory 104 of the system 100, in other implementations, the natural language processing library 120 (or a portion thereof) may be stored remotely in a network-based storage (e.g., "the cloud"). Each entry in the natural language processing library 120 includes audio data (e.g., one or more sound features) and a textual label that represents one or more of the categories. The categories 121 may include speaker categories (as used herein, a speaker refers to a person who speaks), acoustic event categories (e.g., particular events associated with a sound, such as breaking glass, a television, a car driving by, etc.), acoustic environment categories (e.g., particular locations associated with ambient sounds, such as rooms in a house, a vehicle, an office, etc.), or a combination thereof. The natural language processing library 120 may include initial (e.g., preprogrammed) entries and may also include entries that are generated by a user (e.g., the user may register one or more speakers with the system 100 for use as training data and for speaker identification). For example, a user may be registered with the system 100 by registering a name of the user and having the user speak a particular set of training words or phrases. The training words or phrases may be used by the system 100 to create one or more models for voice recognition.

The microphone 110 is configured to capture an audio input 112 and to generate input audio data 114 based on the audio input 112. The audio input 112 may include an utterance (e.g., speech) from a speaker (e.g., a person) and an additional sound (or other speech) that is captured by the microphone 110. In a particular implementation, at least a portion of the audio input 112 corresponds to keyword-independent speech (e.g., speech that does not include a keyword as the first word). For example, the speech may correspond to a command, such as "turn on the kitchen light," that does not include a keyword.

The processor 102 is configured to convert the input audio data 114, or a portion thereof, into a text string 150. For example, the processor 102 may be configured to perform text to speech conversion on the input audio data 114 to convert the input audio data 114, or a portion thereof that includes speech, into the text string 150. To further illustrate, the processor 102 may compare the input audio data 114 (or a portion thereof) to known models for different words and sounds as part of a process to generate text data indicating the words represented by the input audio data 114. The text string 150 includes a textual representation of the speech included in the input audio data 114. In some implementations, the processor 102 may be configured to determine whether the input audio data 114 includes speech prior to attempting to convert the input audio data 114. For example, the processor 102 may perform voice activity detection (VAD) on the input audio data 114, and if a voice activity level satisfies a threshold, the input audio data 114 (or a portion thereof) may be identified as speech. If the voice activity level does not satisfy the threshold, the input audio data 114 may be discarded (or otherwise not further processed).

The processor 102 is configured to perform natural language processing on at least the text string 150 to generate an output text string 152. To illustrate, performance of natural language processing on the text string 150 may generate a semantic representation of the text string 150 (e.g., the output text string 152). For example, the natural language processing may identify an action to be performed, a location associated with an action, a device associated with the action, an object of the action, or a combination thereof. In some implementations, the identified elements may be annotated in the output text string 152. Thus, performing the natural language processing on the text string 150 may generate the output text string 152 that includes an action associated with at least one of a first device, a speaker (e.g., a person speaking), a location, or a combination thereof. In a particular implementation, the first device is at least one of a smart appliance, an Internet of Things (IoT) device, a mobile device, a smart speaker, a television, a vehicle, or a robot. Although the processor 102 is described as performing the natural language processing, in other implementations, one or more separate, dedicated processors may perform the natural language processing.

In addition to performing the natural language processing on the input audio data 114 (or a portion thereof that includes speech), the processor 102 may compare the input audio data 114 (e.g., a portion that includes a sound distinct from the speech) to audio data stored in the natural language processing library 120 to determine whether the input audio data 114 matches any of the categories 121. For example, each of the categories 121 may include audio data (e.g., audio features) that correspond to the category. If the input audio data 114 is within a threshold similarity of any of the audio data of the categories 121, a match is found. For example, probabilities may be determined for each of the categories 112 indicating a likelihood that the input audio data 114 (or a portion thereof) matches audio data of the category, and if the probability corresponding to any category satisfies a threshold, a match is found (e.g., the input sound matches the category). If none of the probabilities satisfy the threshold, the processor 102 determines that the input audio data 114 represents a new sound, and thus a new category.

If the input audio data 114 (or a portion thereof) matches one of the categories 121, the label for the category (e.g., a textual label) is used as an input to the natural language processing of the speech portion of the input audio data 114. For example, the processor 102 may be configured to perform additional natural language processing on the label of the matching category. The additional natural language processing may identify a location of a user, a device the user is interacting with, or other information, as further described herein.

If the input audio data 114 (or a portion thereof) does not match any of the categories 121, the processor 102 is configured to create a new category 122 for storage in the natural language processing library 120. The new category 122 may include audio data 124 and a category label 126. The audio data 124 may be the portion of the input audio data 114 that corresponds to the new sound. For example, the processor 102 may extract one or more audio features from the input audio data 114 that correspond to the new sound, and the processor 102 may store the one or more audio features as the audio data 124. The processor 102 may create the label 126 and associate the label 126 with at least a portion of the output text string 152. For example, the output text string 152 may identify a location, and the location may be associated with the label 126. After generation of the audio data 124 and the label 126, the processor 102 may update the categories 121 with the new category 122 (e.g., with the audio data 124 and the label 126).

To illustrate, a user may be in the kitchen using cutlery (e.g., using a knife to cut vegetables, as a non-limiting example) and may speak the command "turn on the kitchen light." A first portion of the input audio data 114 may correspond to the user speech "turn on the kitchen light" and a second portion of the input audio data 114 may correspond to the sound of cutlery being used. In this example, the system 100 is integrated within a smart speaker system that can be located in the kitchen. The processor 102 may identify the user speech and perform automatic speech recognition to generate the text string 150, which in this example is a textual representation of "turn on the kitchen light." The processor 102 may perform natural language processing on the text string 150 to generate the output text string 152, which is associated with at least one of a first device, a speaker, a location, or a combination thereof. In this example, the output text string 152 is associated with a location (e.g., the kitchen). The results of the natural language processing may be used to generate the new category 122. For example, the processor 102 may associate the label 126 with "kitchen" (e.g., a portion of the output text string 152) to generate the label 126 "kitchen sounds." The processor 102 may also update the categories 121 with the new category 122, including the audio data 124 (corresponding to the second portion of the input audio data 114) and the label 126. Thus, audio data of the new sound (e.g., the sound of cutlery being used) may be stored in the natural language processing library 120 for use in identifying the sound if the sound occurs again.

The processor 102 may also be configured to determine an operation 156 based on the action and to initiate performance of the operation 156. For example, the processor 102 may initiate turning on the kitchen light based on the natural language processing of the user speech. As other examples, the operation 156 may include turning on (or off) a device or component that is communicatively coupled to the processor 102, modifying a setting or configuration of the device or component, executing an application stored at the memory 104, other operations, or a combination thereof. For example, the processor 102 may communicate with another device (e.g., via a wireless network) to cause the other device to perform an operation or to change a state. Additionally, or alternatively, the processor 102 may execute an application stored at the memory 104.

At a later time, second input audio data including the cutlery sounds and user speech "turn on the light" may be received. The processor 102 may compare a portion of the second input audio data (e.g., the portion corresponding to the cutlery sounds) to the categories 121 (including the new category 122). A probability that the portion of the second input audio data matches the new category 122 may satisfy a threshold, such that the new category 122 is identified as a match. The label 126 may be used as a contextual input to natural language processing of the speech "turn on the light." Based on the contextual input, the natural language processing may identify "turn on the light" as a command to turn on a particular light and may identify a location as the kitchen. Thus, the command may be interpreted as an action to turn on a light in the kitchen. Based on the action, the processor 102 may initiate performance of an operation, such as by initiating performance of turning on the kitchen light. For example, the processor 102 may send a command to perform the operation to another device, such as a power-control device coupled to the kitchen light.

As another example, a user may be talking to another person, and the processor 102 may process the user's speech to identify the other person and create the new category 122. To illustrate, the processor 102 may receive input audio data that includes the user talking to a particular person (e.g., Josh). During the conversation, the user may say Josh's name multiple times. Based on the frequency of the name Josh in the user's speech, the processor 102 may identify the new person as "Josh". The processor 102 may create the new category 122 with the label 126 as "Speaker—Josh" or "Josh", and the processor 102 may update the categories 121 with the new category 122. Additionally, the processor 102 may store audio data of Josh speaking as the audio data 124, which may be used as training data to train a speech recognition model to recognize speech by Josh. In another particular implementation, in response to detecting a new speaker (e.g., a person different than the user, or one of the people that the user has trained the system 100 to recognize), the processor 102 may detect whether or not an unrecognized mobile device is nearby. If an unrecognized mobile device (e.g., a mobile device that is not registered with the system 100) is nearby, the processor 102 may query the mobile device for a name of a user of the mobile device. If the mobile device is configured to reply to queries, the mobile device may provide the name "Josh" to the processor 102, and the processor 102 may store the name "Josh" as the label 126 for the new category 122. In some implementations, the processor 102 is further configured to request audio data from a speaker recognition module of the mobile device, and the audio data may be stored as the audio data 124. In another particular implementation, the processor 102 may cause the mobile device to initiate a training procedure. For example, the mobile device may provide a prompt to cause Josh to speak a particular set of training words, phrases, or sentences to be used as training data for generating voice recognition models at the mobile device and the processor 102.

In some implementations, detection of particular people speaking may be associated with performance of a particular operation (or prohibition of a particular operation). As a particular example, the system 100 is integrated in a television that is configured to identify people speaking nearby. To illustrate, multiple people may be registered with the system 100 for providing voice recognition. The registration may include storing a name associated with each user and having each user speak training words or phrases for generating voice recognition models. Additionally, the television may be configured with controls to prevent particular content from being displayed to some users. For example, the television may be configured to allow an adult user to view content having any rating and to prevent a child user from viewing particular content based on various parental controls. In response to the television identifying the voice of a child user (based on the one or more categories 121), the television may prohibit certain operations. For example, the television may block viewing of content associated with a particular rating (e.g., a rating that exceeds a parental control threshold) in response to detecting the child user's voice. Additionally, or alternatively, the television may be configured to only respond to commands from particular users. For example, if the television detects speech from a person who is not a registered user, the television may take no action in response to commands spoken by the person.

In some implementations, the processor 102 discards audio data corresponding to sounds that do not satisfy a frequency threshold. For example, the processor 102 may add new categories corresponding to sounds that have been identified more than a threshold number of times within a particular time period. To illustrate, the processor 102 may maintain a count 158 of a number of times that a particular new sound is identified. If the count 158 exceeds a particular threshold (e.g., a threshold number of times) within an initial time period, a new category corresponding to the new sound is added to the natural language processing library 120. If the count 158 does not exceed the threshold, the sound is buffered for a particular amount of time. For example, system 100 may include an audio buffer 160 configured to store audio data corresponding to sounds that are not associated with categories in the natural language processing library 120. Each sound may be associated with a count value of the number of times that the sound is identified. Sounds that are not identified a threshold number of times within the particular time period may be discarded. For example, sounds in the audio buffer 160 that are associated with counts that do not exceed the threshold may be removed from the audio buffer 160 after the particular time period has lapsed. In this manner, new categories are created for sounds that are frequently occurring, such that the sounds are likely to occur again and are thus likely to be useful as context for natural language processing. The threshold number of times may be set to a particular value based on a size of the memory 104 (e.g., such that a size of the natural language processing library 120 does not exceed a size of the memory 104), based on a desired responsiveness, or may be user-selectable.

In some implementations, additional data, such as multi-modal data, is provided as inputs to the natural language processing. For example, the camera 116 may be configured to capture image data associated with the input audio data 114, and the natural language processing is performed based further on one or more text strings that are generated based on the image data. To illustrate, the image data may include an image in which the user is located in the living room, which may be converted to a text string "the user is in the living room" and used as an input to the natural language processing. As another example, the position sensor 118 may be configured to determine a position associated with the input audio data 114, and the natural language processing is performed based further on one or more text strings that are generated based on the position. To illustrate, the position sensor 118 may determine a position associated with the user when the user speaks a command, and the processor 102 may convert the position to a location within a house such that the processor is able to generate a text string, such as "the user is in the kitchen" for use as an input to the natural language processing. In other implementations, the multi-modal data includes microphone proximity data, direction of arrival (DOA) data, the image data, the position data, or a combination thereof.

The processor 102 may also be configured to generate a notification 154 indicating the new category label (e.g., the label 126). The notification 154 may be provided to a user. In a particular implementation, the notification 154 is an audible notification. For example, the processor 102 may cause an audio output to be generated that indicates that the system 100 has identified the new category 122 which is associated with the label 126. In another particular implementation, the notification 154 is a haptic notification. For example, the system 100 may vibrate or buzz to indicate the notification 154. In another particular implementation, the notification 154 is a visual notification. For example, the display device 108 may be configured to display a graphical user interface (GUI) 130 that includes the notification 154. The display device 108 may include any type of display device, such as a liquid crystal display (LCD) screen, a touch screen, or a separate monitor or other display, as non-limiting examples.

In some implementations, the notification 154 may include a prompt for the user to input additional information. For example, the notification 154 may indicate that the new category 122 has been identified and that the new category 122 has the label 126. The notification 154 may also prompt the user to input a different label if the label 126 is not correct. For example, the interface device 106 may be configured to receive a user input 132 that indicates a text string to be used as the label 126. In some implementations, the interface device 106 includes a keypad or a touchscreen, and the user input 132 is responsive to the GUI 130. In another implementation, the interface device 106 includes a microphone, such as the microphone 110, and the user input 132 includes a voice input. In another implementation, the interface device 106 includes a camera, such as the camera 116, or another visual sensor, and the user input 132 includes a gesture.

In some implementations, the notification 154 may be provided to the user in the case that a new category is unable to be labeled. For example, in some situations, results of the natural language processing may not identify sufficient information to generate the label 126 for the new category 122. In such situations, the processor 102 may include a prompt in the notification 154. The prompt requests a text label for the new category 122. In a particular implementation, the prompt is displayed via the GUI 130. The GUI 130 may also enable the user to play back audio (e.g., from the input audio data 114) and may ask the user to provide a text label via the interface device 106. The user may respond to the prompt by providing the user input 132, which may be an entry (e.g., via a touchscreen or keypad), an audio input (e.g., user speech), or a gesture. In a particular implementation, the notification 154 (including the prompt) is displayed via the display device 108. In an alternate implementation, the system 100 does not include the display device 108, and the GUI 130 (including the notification 154) is displayed on a mobile communication device of the user. The mobile communication in this example executes an application associated with the system 100, which may enable the user to interact with the system 100. In another implementation, the notification 154 (including the prompt) is provided to the user as an audio notification, and the user interacts with the system 100 using speech and audio commands.

In some implementations, processor 102 stores unknown sound information for a particular amount of time before prompting the user to identify and label the sounds. For example, the processor 102 may store audio inputs that are not identified for a particular amount of time, such as a day, a week, a month, etc. The particular amount of time may be set based on a size of the memory 104 or may be user-selectable. After the particular amount of time expires, the processor 102 may provide the notification 154 (including the prompt) to the user. As an example, the GUI 130 may display "I learned two new speakers and five new sound categories this week. Would you like to listen to them and label them? This will be helpful for natural language processing contextual awareness." Responsive to the notification 154, the user may enter labels for the new categories. The labels may be entered using a user input device, such as a keypad or touchscreen, or the labels may be entered as voice commands.

Additionally, or alternatively, the notification 154 may be sent to another device. For example, the transmitter 140 may be configured to transmit the notification 154 to at least one device (e.g., a second device 144) at a location associated with the output text string 152. The second device 144 may include a smart appliance, an IoT device, a mobile device, a smart speaker device, a television, a vehicle, or a robot, as non-limiting examples. To illustrate, in the example described above, the transmitter 140 may transmit the notification 154 to a device located in the kitchen, such as to a smart appliance (e.g., a refrigerator, an oven, a dishwasher, a washing machine, or a dryer, as non-limiting examples) or other IoT device (e.g., the second device 144). As another example, the transmitter 140 may be configured to transmit the notification to a first device indicated by the output text string 152. To illustrate, if the output text string corresponds to "turn up the volume on the television," the transmitter 140 may transmit the notification 154 to the television (e.g., the second device 144). Transmitting the notification 154 to the second device 144 may enable the second device 144 to update a respective natural language processing library to include the new category 122. For example, in addition to sending the notification 154 (that indicates the label 126), the transmitter 140 may also send the audio data 124 such that the second device 144 is able to add the new category 122, including the audio data 124 and the label 126, to its natural language processing library.

The second device 144 may also be configured to share additional categories determined at the second device 144 with the system 100. For example, the receiver 142 may be configured to receive a second notification 146 from the second device 144. The second notification 146 may indicate a second new category and an associated second text string (e.g., a second new category label). The second device 144 may be associated with the second text string (e.g., the second text string may identify the second device 144) or the second device 144 may be located at a second location associated with the second text string. In some implementations, the second device 144 also sends audio data associated with the second new category to the receiver 142. Based on receipt of the second notification 146, the processor 102 may update the categories 121 to include the second new category. In this manner, audio categories that are determined at various devices may be shared between devices, thereby improving the response to audio inputs at each of the devices.

In some implementations, the processor 102 is further configured to correlate emotions with at least some of the categories of the natural language processing library 120. For example, the processor 102 may be configured to receive multi-modal data indicative of an emotion of the user. The multi-modal data may include image data, audio data, sensor data, or other types of data. As an example, the camera 116 may capture an image of the user smiling, which may correlate to a happy emotional state. As another example, user speech may be received as audio data, and the audio data may be processed to determine an emotional state of the user, such as by analyzing a pitch of the speech, a frequency of the speech, an energy level of the speech, or another characteristic of the speech. To illustrate, speech having a high frequency may be associated with an excited state, speech having a high energy level may be associated with an angry state, and speech having a low frequency of low pitch may be associated with a sad state. As another example, one or more biometric sensors may provide data, such as heart rate, body temperature, other measurements, or a combination thereof, that may be used to determine an emotional state of the user.

To illustrate, when the input audio data 114 is received, the processor 102 may determine an emotion 128 of the user associated with the input audio data 114. The emotion 128 may be determined based on the multi-modal data. As a particular example, the processor 102 may determine that the user is happy when the input audio data 114 is received based on an image of the user smiling, based on a frequency of speech contained in the input audio data 114, or based on other multi-modal data. The emotion 128 may be associated with the new category 122 and updated in the natural language processing library 120. Thus, multi-modal data (e.g., image data, audio data, sensor data, etc.) may be used to determine emotions associated with the categories 121 of the natural language processing library 120, and those emotions may be stored as fields within the categories 121. The emotion 128 may also be identified to other devices. For example, the transmitter 140 may be configured to transmit a notification of the emotion 128 to at least one device, such as the second device 144. To illustrate, the notification 154 may include or indicate the emotion 128. Although described in the context of an acoustic category update, such update may also occur for a speaker category. For example, the processor 102 may be configured to determine a speaker category associated with a speaker identified as a result of the natural language processing. The processor 102 may be further configured to associate the emotion 128 with the speaker category, and to update the speaker category within the natural language processing library 120.

Based on the emotions associated with a particular category or command, the processor 102 may be configured to perform an emotional-aware operation. To illustrate, the processor 102 may be configured to determine that second input audio data matches the new category 122, to determine an operation based on the emotion 128, and to initiate performance of the operation. For example, second input audio data may be identified as a particular speaker (e.g., person speaking) by comparing the input audio data to the categories 121 of the natural language processing library 120, and an emotion correlated with the particular speaker may be determined and used to update the categories 121. As a particular example, the speaker may be identified as "Josh", and the emotion correlated with Josh may be anger. Based on this correlation, the processor 102 may issue a message "Josh seems to negatively affect your mood. Would you like help avoiding him?" The processor 102 may also implement one or more scheduling operations, such as removing an item from a schedule, changing an item of the schedule, or adding an item to the schedule, to effectuate the outcome (e.g., avoiding Josh).

In some implementations, the memory 104 may store additional information, such as correlations between various contexts (e.g., locations or environments) and emotions. For example, based on previous multi-modal data, the location "grocery store" may be associated with high stress/anxiety. This correlation may be represented by data stored at the memory 104. Alternatively, the data may be stored remotely (e.g., in the cloud). When the processor 102 receives input audio data that includes the command "navigate me to the grocery store," the processor 102 may perform natural language processing on the command to identify the location "grocery store." Based on the emotion (e.g., stress/anxiety) associated with this category (e.g., the grocery store), the processor 102 may perform an emotion-aware operation to attempt to manage the user's negative mood. For example, the processor 102 may cause output of an audio message "Are you sure you want to go there? This place makes you stressful." As another example, the processor 102 may access information associated with the grocery store via the Internet to determine a time when crowds are least likely, and the processor 102 may provide such information to the user. For example, the processor 102 may cause output of an audio message "Let's go in one hour. The location should be less crowded at that time." Such emotion-aware operations may improve or otherwise manage the user's mood.

In some implementations, the system 100 is integrated in a vehicle, and the vehicle is configured to perform emotion-aware operations based on a detected emotion of a user. For example, the vehicle (e.g., the processor 102 of the vehicle) may receive input audio data corresponding to the command "navigate me to work." The vehicle may access the natural language processing library 120 to determine that "work" is a category that correlates to sadness. Based on identifying "work" as a location, the vehicle may perform an emotion-aware operation such as activating an application or service that is associated with happiness. For example, playing music may be associated with happiness, so the vehicle may initiate playing of music via speakers in a vehicle in addition to providing directions to work. As another example, the vehicle may determine that calling the user's spouse is associated with happiness. In this example, the vehicle may issue a prompt "Would you like to call your spouse? Calling your spouse improves your mood." If the user agrees, the vehicle may send a command to a user's mobile phone to initiate a phone call to the user's spouse.

As yet another example, the vehicle (e.g., the processor 102 of the vehicle) may receive input audio data corresponding to the command "navigate me to home." The vehicle may receive multi-modal data that indicates that the user is "excited." Based on the emotion (e.g., excited), the vehicle may activate one or more safety features of a vehicle in addition to providing directions to home. Although the previous examples have been described in the context of a vehicle performing operations, in other implementations, the operations are performed by a mobile device of the user (that may be used within a vehicle).

Thus, the system 100 enables identification of new sounds for storage as new categories within the natural language processing library 120. For example, new sounds may be identified and labeled based on the output of natural language processing operations. As new categories are created, the new categories may be used to determine context of additional user commands. As a particular example, a category may be added for "kitchen sounds" that identifies the sound of cutlery being used. In response to a later user command that is detected along with detection of the sound of cutlery being used, a text string "the user is in the kitchen" may be used as an input to natural language processing of the user command, which may provide a location for a particular operation to be performed. Because the sound is identified as corresponding to the kitchen, the user does not have to include in speech that the user is located in the kitchen (or that the command applies to the kitchen). In this manner, the system 100 adapts to various auditory sounds and provides an improved user experience. For example, the user may be able to use more naturally spoken audio commands (e.g., the user does not have to remember to speak every word related to the user's context) when interacting with the system 100. Additionally, accuracy of the operations performed responsive to user commands may be improved, which further improves the user's experience. Additionally, notifications may be generated and sent to other devices, such as smart appliances, IoT devices, and other devices, to enable the devices to have improved context awareness when processing input audio.

Additionally, the system 100 may correlate emotions with the sounds (or other categories, such as locations, people, actions, other contexts, etc.) and use the correlated emotion information to perform emotion-aware operations. For example, in response to determining that a user command indicates a location that correlates to sadness in the user, the system 100 may perform one or more operations, such as turning on music or offering an alternative operation, to improve the mood of the user. Such emotion-aware operations may be of particular benefit to people with post-traumatic stress disorder, the elderly, or others who may appreciate suggestions by the system 100 to reduce negative emotions in their day-to-day lives.

Figure 2:
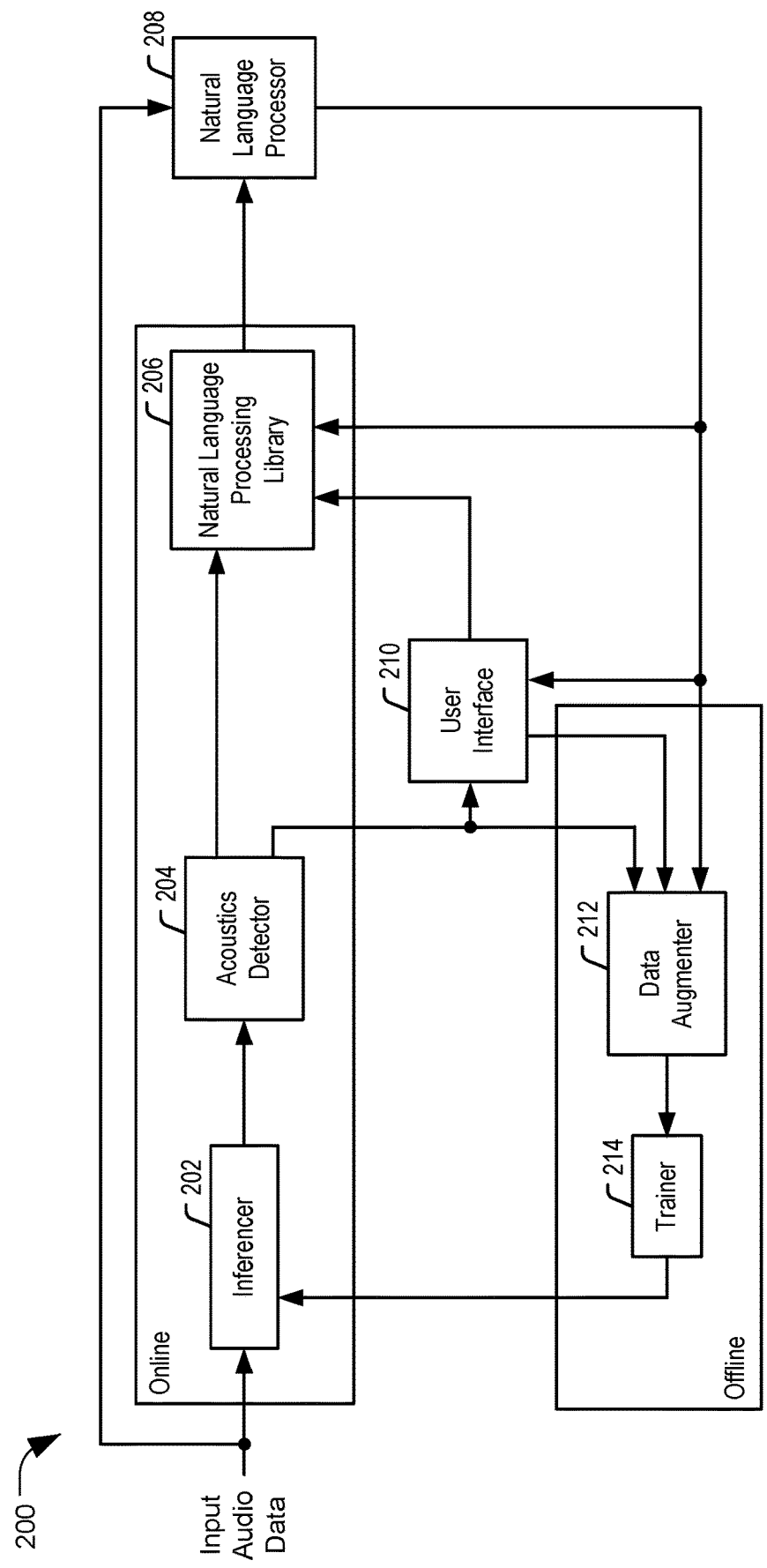
FIG. 2 is a block diagram of a particular illustrative aspect of a system to perform audio analytics.

Referring to FIG. 2, an illustrative implementation of a system configured to perform audio analytics is shown and generally designated 200. In a particular implementation, the system 200 may include or correspond to the system 100. For example, the elements of the system 200 may include or correspond to hardware within the processor 102, as a non-limiting example. Each of the elements of the system 200 may be represented in hardware, such as via an application-specific integrated circuit (ASIC) or a field-programmable gate array (FPGA), or the operations described with reference to the elements may be performed by a processor executing computer-readable instructions.

The system 200 includes an inferencer 202, an acoustics detector 204, a natural language processing library 206, a natural language processor 208, a user interface 210, a data augmenter 212, and a trainer 214. The inferencer 202 may be configured to receive input audio data and perform inferencing. The inferencing may include operations to identify types of audio inputs and other operations performed on input audio data prior to natural language processing. For example, the inferencing may include performing voice activity detection (VAD) to identify speech. If a voice activity level determined based on the input audio data satisfies a threshold, the input audio data may be identified as containing speech. As another example, multi-microphone direction of arrival operations may be performed to determine a direction of arrival of the sound corresponding to the input audio data at a microphone, such as the microphone 110 of FIG. 1. As another example, direct-to-reverb ratios (DRRs) may be determined for each detected speaker (e.g., person speaking). As another example, acoustic activations may be determined based on the input audio data. For example, the input audio data may be compared to input audio data of a natural language processing library, such as the natural language processing library 120 of FIG. 1, to determine confidence values indicating a confidence that the input audio data matches the particular categories. In some implementations, additional data may be received, and emotions may be determined.

To illustrate, five users, Susan, Nate, Rick, Carla, and John may be enrolled with the system, three emotions may be programmed: sad, neutral, and happy, four acoustic environments may be programmed: living room, storage, bedroom, and bath, and four acoustic events may be programmed: fan, television, walking, door close. The particular examples are for illustration and are not intended to be limiting. In other examples, other values may be programmed (e.g., either pre-programmed or updated during use of the system). As a particular example, the audio activation may generate the following audio activation vectors: speaker—[0.3, 0.5, 0.9, 0.3, 0.2], DRR—[0, −5, 10, 0, −5], emotion—[0.3, 0.9, 0.1], acoustic environment—[0.9, 0.2, 0.1, 0.4], and acoustic event—[0.7, 0.4, 0.1, 0.3], which respectively correspond to speaker—[Susan, Nate, Rick, Carla, John], DRR—DRR for each detected speaker, emotion—[sad, neutral, happy], acoustic environment [living room, storage, bedroom, bathroom], and acoustic event—[fan, television, walking, door close].

The acoustics detector 204 may be configured to compare the audio activation values to a threshold to determine whether known or unknown acoustics are detected. If the activation values satisfy the threshold, a match may be determined (e.g., known acoustics are detected). For example, if the threshold is 0.6, the audio activation vectors described above may indicate that the input audio data corresponds to Rick, who is feeling neutral, is located in the living room, and has the fan running.

To compare the input audio data to known categories, the natural language processing library 206 may be accessed. For example, if the results of the acoustic detection are a match, the audio data stored for the matching category may be updated to include the input audio data. Alternatively, no update may occur if the input audio data matches the audio data of one of the categories of the natural language processing library. Instead, updating may occur in response to detection of no match, as further described herein.

If a match is detected, the text label of the matching category is provided as a contextual input to the natural language processor 208. For example, if the living room acoustic environment is a match, the text string "the user is in the living room" (or similar) may be provided as a contextual input to natural language processing of the input audio data. As a particular example, the input audio data may include the speech "turn on the TV," and based on the contextual input, the natural language processor 208 may identify an action: to turn on a television (TV) in the living room. In some implementations, the natural language processor 208 is a separate processor. Alternatively, the system 200 may include a single processor that performs the operations of all of the various components.

Alternatively, if the results of the acoustic detection do not indicate a match, the results of the natural language processing may be used to generate a new category. For example, if the input audio data includes an unknown sound (as a particular example, the sound of cutlery being handled) in addition to the command "turn on the kitchen light," the results of the natural language processing (e.g., an identification of the kitchen as a location) may be used to generate a new acoustic environment category—kitchen. The label for the new category may be set as kitchen, based on the output of the natural language processing of the input audio data. Additionally, the portion of the input audio that corresponds to the sounds of cutlery being used may be stored at the natural language processing library 206 as the audio data for the new category. In some implementations, an emotion correlated with the new category is also stored. Once the new category is created, the natural language processing library is updated to include the new category (including the label, the audio data, and optionally the emotion).

The user interface 210 is configured to provide a notification to a user. For example, a notification that identifies the new category may be generated and provided to a user via the user interface 210. The user interface 210 may be visual (e.g., a GUI), auditory, or a combination thereof. Additionally, or alternatively, the notification may be transmitted to other devices to enable the other devices to add the new category to natural language processing libraries at the other devices.

In some situations, an unknown sound is unable to be categorized based on the output of the natural language processing. If this occurs, a notification may be presented via the user interface 210. The notification may prompt the user to enter a label for the new sound. For example, the notification may state "I have identified a new acoustic sound. Would you like to label the new acoustic sound? This will help with natural language processing contextual awareness." The notification may enable the user to play back the input audio data (or a portion thereof) in order to determine the label associated with the input audio data. Responsive to the notification, the user may enter a label for the unknown sound, and the label may be used to generate a new category in the natural language processing library 206. In some implementations, if the input audio data does not include a command capable of undergoing natural language processing, the notification is generated in response to unknown acoustic detection by the acoustics detector 204.

After the new category is generated (either based on the output of the natural language processing or based on user input in response to the notification), the input audio data (or a portion thereof) and the new category label are provided to the data augmenter 212. The data augmenter 212 may update the natural language processing library 206 with the new categories. Additionally, the input audio data (or a portion thereof) may be provided to the trainer 214, and the trainer 214 may be configured to update one or more models, such as speaker (e.g., a person speaking) models, acoustic detection models, etc.

In the particular implementation illustrated in FIG. 2, the operations performed by the inferencer 202, the acoustics detector 204, and the natural language processing library 206 may be performed "online," and the operations performed by the data augmenter 212 and the trainer 214 may be performed "offline." Online may refer to time periods during which the input audio data is processed, up to performance of the natural language processing. In some implementations, the natural language processing is also performed online. Offline may refer to idle time periods or time periods during which input audio data is not being processed. Because notifying via the user interface 210 may be performed online (e.g., as new categories are processed) or offline (e.g., after a particular amount of time has expired, such as a day, a week, or a month), the user interface 210 is illustrated as located between the online and the offline sections.

Figure 3:
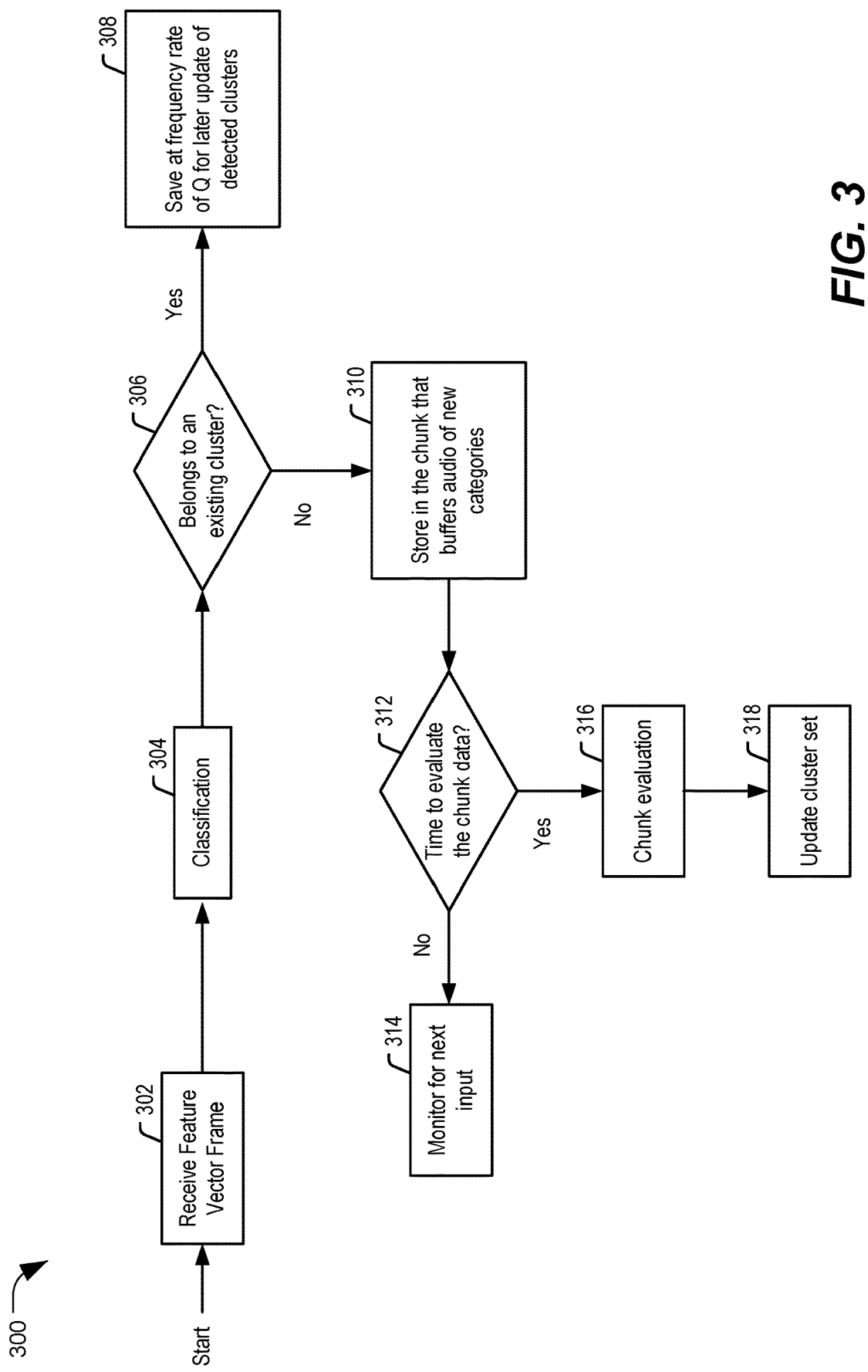
FIG. 3 is a flow chart that illustrates a method of classifying input audio and updating an audio cluster set.

Referring to FIG. 3, a flow chart of an illustrative method of classifying input audio and updating an audio cluster set is shown and generally designated 300. In a particular implementation, the method 300 is performed by the system 100 of FIG. 1, such as by the processor 102.

The method 300 includes receiving a feature vector frame, at 302. For example, the input audio data 114 may be received from the microphone 110 at the processor 102. The method 300 include classifying the feature vector frame, at 304. In a particular implementation, the classification may be performed as part of a support vector data description (SVDD) machine learning technique. A SVDD may obtain a spherically shaped boundary around a data set by using a nonlinear transformation (e.g., a kernel function, such as a Gaussian kernel with different width and different γ parameter. To illustrate, for a dataset of $J$ points, where $$X := \{x_j | x_j \in \mathbb{R}^d, j = 1, \ldots, J\},$$

a nonlinear transformation φ from X to a high-dimensional kernel feature space may be used. Using such feature space, the smallest enclosing hypersphere of radius R and center a can be stated as:

$$\mathcal{H}_{(R, a, \xi_j)} = R^2 + \gamma \Sigma_{j=1}^{J} \xi_j$$

where γ establishes a tradeoff between volume and error, and $\xi_j$ punishes samples whose distances from the center a are farther than R with the constraints $$\|\varphi(x_j) - a\|^2 \leq R^2 + \xi_j$$

for all $j$ equal to $1, \ldots, J$.

The Lagrangian function may be represented by $$\mathcal{L}(R, a, \xi_j, \beta_j, \alpha_j) = R^2 + \gamma \sum_{j=1}^{J} \xi_j - \sum_{j=1}^{J} \beta_j (R^2 + \xi_j - \|\varphi(x_j) - a\|^2) - \sum_{j=1}^{J} \alpha_j \xi_j$$

where $\beta_j \geq 0$, $\alpha_j \geq 0$ represents the Lagrange multipliers. The Lagrangian function can be rewritten as $$\mathcal{L} = \sum_{j=1}^{J} \beta_j K(x_j, x_j) - \sum_{j,k=1}^{J} \beta_j \beta_k K(x_j, x_k)$$

where $$K(x_j, x_k) = \exp\left(\frac{1}{\sigma} \|x_j - x_k\|^2\right).$$

The Lagrangian function may be solved with respect to R, a, $\xi_j$, and maximized with respect to $\beta_j$ and $\alpha_j$. Samples with $\beta_j = 0$ are inner samples (e.g., the samples lie inside the sphere or on the sphere's surface). Samples with $0 < \beta_j < \gamma$ are called support vectors (SVs)—these samples lie on the sphere's surface. Samples with $\beta_j = \gamma$ fall outside the boundary and are excluded. New incoming samples may be tested using the following:

$$R^2(z) = \|z - a\|^2$$

If R(z)>R, the sample is inside the sphere (e.g., the sample belongs to the cluster).

A cluster may be defined, for a set of $J$ data samples, as a sphere structure ψ that is defined by the following:

$$\psi = \{\overline{SVs}, \|a\|^2, R, l, P\},$$

where $\overline{SVs}$ denote the support vectors, where the support vectors $\overline{SVs}$ are defined by:

$$\overline{SVs} = \{(x_j, \beta_j) | 0 < \beta_j < \gamma\}.$$

P is a popularity value that is updated as new data is assigned to the cluster. For example, P is increased by one when new data is assigned to the cluster. Samples that are assigned to the cluster are stored at frequency rate Q, for future cluster updates. As a cluster is created, the popularity value P is set to zero.

If P reaches a particular value (e.g., an update threshold), the cluster is updated utilizing the new accumulated data. If the cluster is not detected as a matched class to the new incoming data, the popularity value P is decreased by one. When the popularity value P becomes 0, the cluster can be removed.

To perform the classification, a closest sphere to the input audio frame $\widetilde{F}_t$ is determined, where $\widetilde{F}_t$ is given by the following:

$$\widetilde{F}_t := \{(Z_{i,t}, \widetilde{F}_t, \varepsilon \widetilde{F}_t) | Z_{i,t} \in \mathbb{R}^d, i = 1, \ldots, \mathcal{N}_{r}\}.$$

Next, the distance of each sample in the audio frame $\widetilde{F_t}$ to the center of the closest sphere is computer according to the following:

$$d_c = \frac{\|^\mu \widetilde{F_t} - a_C\|_2}{R_C^2}.$$

The method 300 includes determining whether feature vector frame belongs to an existing cluster, at 306. For example, if the number of instances that fall inside the closest sphere is greater than the number of instances that fall outside the closest sphere, then the audio frame $\widetilde{F_t}$ is assigned to the corresponding sphere. If the audio frame belongs to an existing cluster, the method 300 proceeds to 308, and the cluster is saved at frequency rate Q for later update of detected clusters. If the audio frame does not belong to an existing cluster, the method 300 proceeds to 310, and a new cluster is stored in a chunk that buffers audio of new categories. For example, the new cluster may be buffered in a chunk that is buffered at the audio buffer 160 of FIG. 1.

The method 300 includes determining whether it is time to evaluate the chunk data, at 312. For example, the processor 102 may determine whether a particular amount of time T has passed since the chunk was created. T may be an hour, a day, a week, or a month, as non-limiting examples. If it is not time to evaluate the chunk data (e.g., if the amount of time T has not yet elapsed), the method 300 continues to 314, which includes monitoring for the next input.

If it is time to evaluate the chunk data (e.g., the amount of time T has elapsed), the method 300 continues to 316, and the chunk is evaluated. For example, similarities between data in the chunk may be determined in the feature domain and in the time domain. To illustrate, if two consecutive frames in the chunk within a predefined age range, a determination is made whether the two frames are connected in the feature domain. The age range may be based on age of the samples that make up the audio features, which are defined by the following:

$$h(\zeta) = \exp(-\log_2(\zeta + 1))$$

where $\zeta$ is a frame age factor. When a frame arrives in the chunk, the frame age factor $\zeta$ may be set to zero, and for every incoming frame, the frame age factor $\zeta$ may be increased by one. The particular age range may be pre-defined (e.g., one second, as a non-limiting example), application-specific, or user-selectable. The similarity of the frames in the feature domain may be determined based on Euclidian distance between centers of the frame, or by Euclidian distances between all samples of the frames, as a non-limiting example.

Similar or connected data points in the chunk may define a micro-cluster, sporadic data points are removed. Evaluating the chunk data also includes merging connected micro-clusters. For example, micro-clusters that are connected in the feature domain but that are unrelated in the time domain may correspond to the same audio event occurring at different times. Thus, micro-clusters that are connected in the feature domain are merged. Evaluating the chunk data also includes finding valid micro-clusters for cluster creation and keeping the remaining micro-clusters for a particular time period to be used for potential cluster creation in the future. Valid micro-clusters are defined based on a factor that represents a minimum duration of a received audio signal for cluster creation (e.g., micro-cluster size in terms of data points) and a frequency of the received micro-cluster (e.g., since each micro-cluster is from a continuous time duration, M number of micro-clusters that are similar and from different time-slots are used). Micro-clusters that do not meet the aforementioned criteria stay in the chunk for a particular period of time. For example, an age of the micro-cluster may be compared to the particular period of time, and if the age satisfies (e.g., is greater than or equal to) the particular period of time, the micro-cluster may be removed. The age of a micro-cluster is given by the following:

$$h(\tau) = \exp(-\log_2(\tau_m + 1))$$

where $\tau_m$ is the micro-cluster age factor. The micro-cluster age factor $\tau_m$ is set to zero when the micro-cluster goes through the first chunk evaluation and is increased by one each time the micro-cluster undergoes another chunk evaluation.

The method 300 also includes updating the cluster set, at 318. For example, valid micro clusters determined during chunk evaluation are created, and the rest of the data is kept for a particular time period. The particular time period may be pre-defined (e.g., one month) or user selectable.

Figure 4:
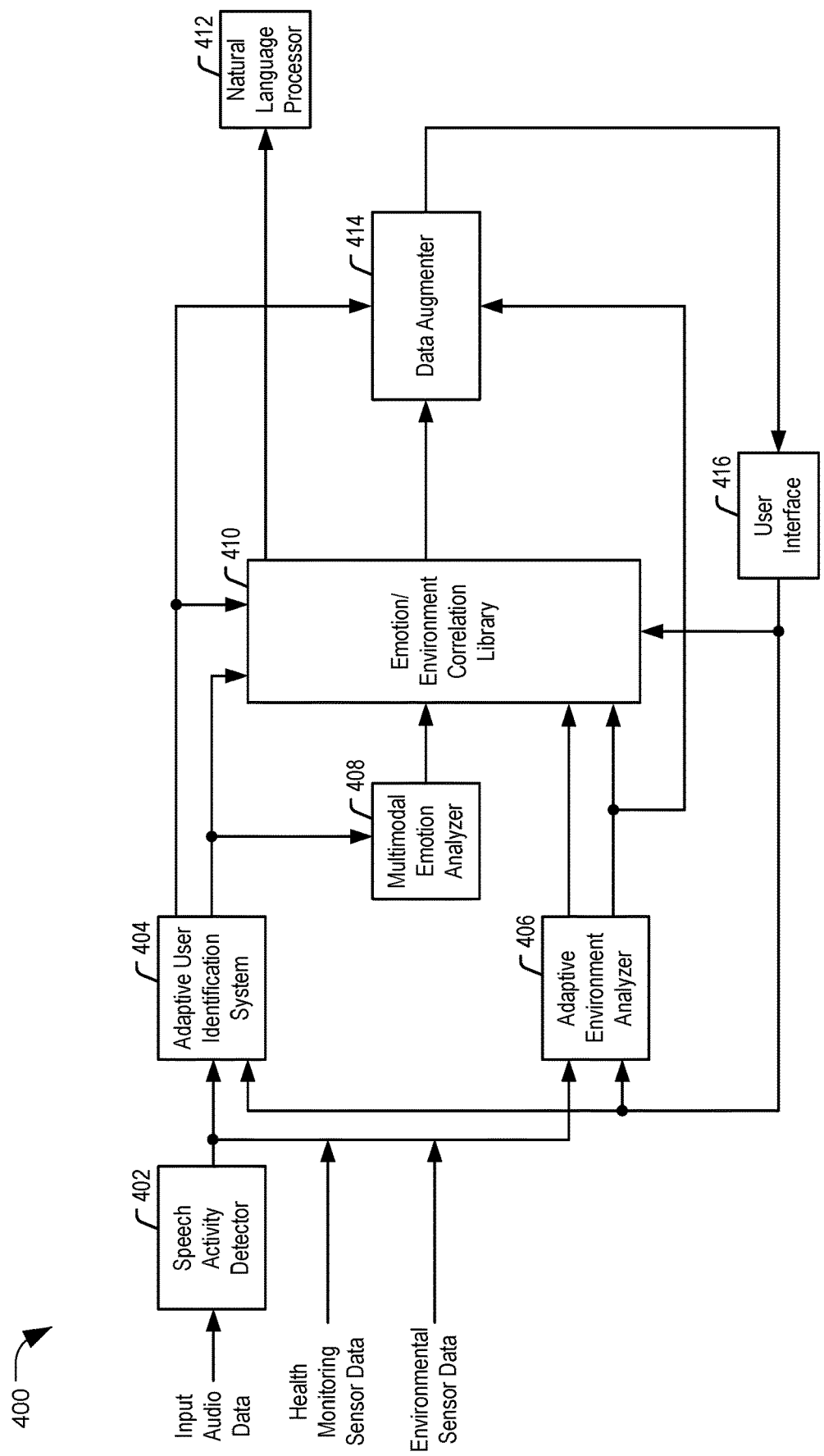
FIG. 4 is a diagram of a particular illustrative aspect of a system to perform audio analytics, emotional monitoring, and emotion-aware operations.

Referring to FIG. 4, an illustrative implementation of a system configured to perform emotional monitoring and emotion-aware operations is shown and generally designated 400. In a particular implementation, the system 400 may include or correspond to the system 100. For example, the elements of the system 400 may include or correspond to hardware within the processor 102, as a non-limiting example. Each of the elements of the system 400 may be represented in hardware, such as via an application-specific integrated circuit (ASIC) or a field-programmable gate array (FPGA), or the operations described with reference to the elements may be performed by a processor executing computer-readable instructions.

The system 400 includes a speech activity detector 402, an adaptive user identification system 404, an adaptive environment analyzer 406, a multimodal emotion analyzer 408, an emotion/environment correlation library 410, a natural language processor 412, a data augmenter 414, and a user interface 416. The speech activity detector 402 may be configured to receive input audio data, such as the input audio data 114 of FIG. 1, and to determine whether the input audio data includes speech. For example, the speech activity detector 402 may perform voice activity detection on the input audio data to determine whether the input audio data includes speech.

The adaptive user identification system 404 may be configured to determine a user of the system 400 based on the input audio data. For example, responsive to a determination by the speech activity detector 402 that the input audio data includes speech, the adaptive user identification system 404 may compare the speech to one or more user models (e.g., trained speech) to determine a user associated with the speech. For example, one or more registered users may provide trained speech for use in speech recognition models, and the speech recognition models for the one or more registered users may be compared to the speech to determine the user associated with the speech.

If the audio data is not recognized as speech of a registered user, the input audio data (or a portion thereof) is provided to the data augmenter 414 for potential generation of a new category. Otherwise, if a registered user is recognized, multimodal data for the user may be provided to the multimodal emotion analyzer 408 for use in determining an emotion experienced by the user. For example, the multimodal emotion analyzer 408 may be configured to determine an emotion of the user based on multimodal data associated with the user. To illustrate, the multimodal data may include health monitoring data (e.g., heartbeat, blood pressure, or body temperature, as non-limiting examples) of the user, image data, audio data, other data, or a combination thereof, and the multimodal data may be used by the multimodal emotion analyzer 408 to determine an emotion of the user. For example, the multimodal emotion analyzer 408 may determine whether the user is sad, neutral, happy, stressed, or exhibits one or more other emotions. The emotion determination may be based on an analysis of the health monitoring data, an analysis of the image data (e.g., analyzing the facial features of the user in the image data to determine an emotion), an analysis of the audio data (e.g., voice activity or energy level analysis, pitch analysis, prosody analysis, etc.), or a combination thereof.

The adaptive environment analyzer 406 may determine an acoustic environment based on the input audio data. For example, the adaptive environment analyzer 406 may compare the input audio data (or a portion thereof that does not include speech) to audio data of one or more categories of the emotion/environment correlation library 410, as described with reference to FIG. 1. In a particular implementation, the emotion/environment correlation library 410 includes or corresponds to the natural language processing library 120 of FIG. 1. Additionally, or alternatively, the adaptive environment analyzer 406 may receive environmental data (e.g., global positioning system (GPS) data, image data from a camera, as non-limiting examples), and the adaptive environment analyzer 406 may determine the environment based further on the environmental data.

Upon finding a match, the emotion determined by the multimodal emotion analyzer 408 may be correlated with the environment determined by the adaptive environment analyzer 406. For example, data indicating the emotion may be stored in association with data indicating the environment, such as by setting an emotion field of the corresponding category. Additionally, text strings based on the environment, the emotion, or both may be provided as inputs to the natural language processor 412. The natural language processor 412 may be configured to perform natural language processing on user speech (after text to speech conversion is performed) to determine an action to be performed by the system 400. The action may include turning on or off a particular device or component, initiating an application, reconfiguring a device, component, application, or other setting, or any other type of machine-controlled operation.

If a new sound, environment, or speaker (e.g., person speaking) is detected, the data augmenter 414 may update the emotion/environment correlation library 410 to include a new category based on the new sound, environment, or speaker. The new category may be similar to the new category 122 of FIG. 1. For example, the new category may include a label, audio data, and data indicating an emotion correlated with the acoustic environment, the acoustic event, or the speaker. In some implementations, the natural language processor 412 may provide an output that is used to determine the label of the new category, as described with reference to FIG. 1. If the acoustic event, acoustic environment, or speaker is unknown even after the natural language processing, a notification may be provided to the user interface 416, and the user interface 416 may interact with the user to request that the user identify the new category. In some implementations, a particular acoustic event, acoustic environment, or speaker is first identified a threshold number of times before the user is notified. Additionally, in some implementations, the notification is provided after lapse of a particular time period, such as a day, a week, or a month, as non-limiting examples. Alternatively, the user can request that the system 400 provide the accumulated new categories at any time.

Figure 5:
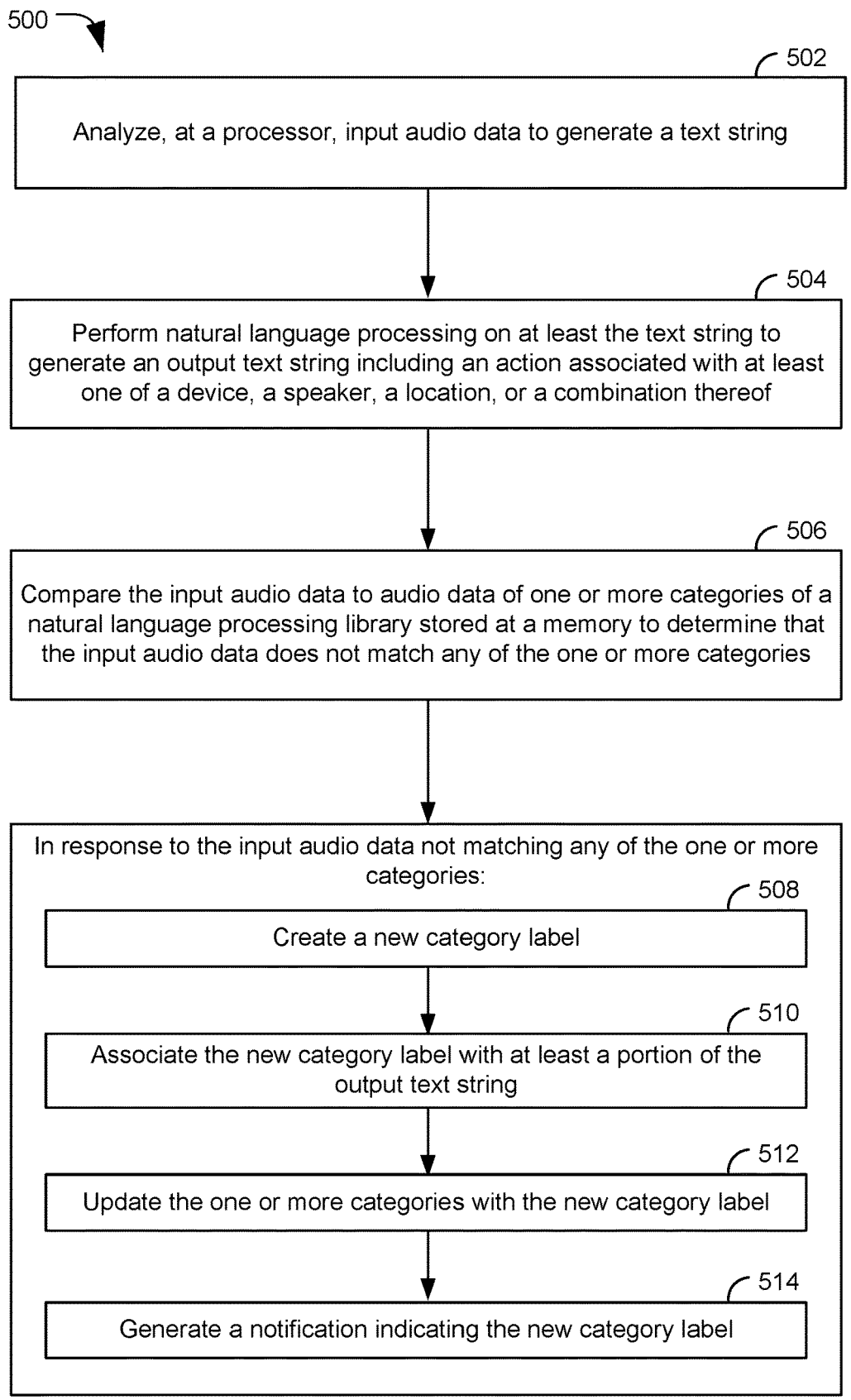
FIG. 5 is a flow chart that illustrates a method of performing audio analytics.

Referring to FIG. 5, a flow chart of an illustrative method of performing audio analytics is shown and generally designated 500. In a particular implementation, the method 500 may be performed by the system 100 of FIG. 1, such as by the processor 102.

The method 500 includes analyzing, at a processor, input audio data to generate a text string, at 502. For example, the processor may include or correspond to the processor 102, the input audio data may include or correspond to the input audio data 114, and the text string may include or correspond to the text string 150 of FIG. 1.

The method 500 includes performing natural language processing on at least the text string to generate an output text string including an action associated with at least one of a device, a speaker, a location, or a combination thereof, at 504. For example, the processor 102 (or a separate processor) may perform natural language processing on the text string 150 to generate the output text string 152 that includes an action associated with at least one of a device, a speaker, a location, or a combination thereof.

The method 500 includes comparing the input audio data to audio data of one or more categories of a natural language processing library stored at a memory to determine that the input audio data does not match any of the one or more categories, at 506. For example, the processor 102 may compare the input audio data 114 to audio data of the categories 121 of the natural language processing library 120 stored at the memory 104.

The method 500 also includes, in response to the input audio data not matching any of the one or more categories, creating a new category label, at 508, associating the new category label with at least a portion of the output text string, at 510, updating the one or more categories with the new category label, at 512, and generating a notification indicating the new category label, at 514. For example, the processor 102 may create the new category 122 that includes the audio data 124 and the label 126. Further, the processor 102 may generate the notification 154 indicating the new category 122.

In a particular implementation, the method 500 includes determining an operation based on the action and, initiating performance of the action. For example, the processor 102 may determine that the operation 156 corresponds to an action indicated by the output text string 152, and the processor 102 may initiate performance of the operation 156. The operation 156 may include turning on or off a component or device, executing an application, reconfiguring a setting (e.g., of the system 100, of a component or device, or of an application executed by the processor 102, as non-limiting examples), or a combination thereof.

In a particular implementation, the method 500 includes analyzing second input audio data, determining that the second input audio data matches input audio data of a particular category of the one or more categories, and performing second natural language processing on the second input audio data based on a particular category label of the particular category. For example, if the processor 102 determines that at least a portion of the second input audio data matches audio data of a particular category (e.g., kitchen sounds), the processor may generate a text string (e.g., "the user is in the kitchen") to use as a contextual input to natural language processing of speech included in the second input audio data.

In a particular implementation, the method 500 further includes determining a count of times that the input audio data is identified, where the notification is generated based at least in part on the count satisfying a threshold. For example, the processor 102 may determine the count 158 of the number of times that audio matching the input audio data 114 (or a portion thereof) is identified, and if the count 158 satisfies (e.g., is greater than or equal to) a threshold, the new category 122 may be created. In this manner, new categories are created for frequently reoccurring sounds, and are not created for sounds that only occur once or a few times. The threshold may be preset or may be user-selectable. Additionally, or alternatively, the notification 154 may be provided to the display device 108 after lapse of a particular time period, such as a day, a week, or a month, as non-limiting examples.

In another particular implementation, the method 500 further includes transmitting the notification to a device identified by the output text string or located at the location associated with the output text string. For example, the transmitter 140 may transmit the notification 154 to the second device 144, which may be the device identified by the output text string 152 or a device at the location identified by the output text string 152. Transmitting the notification 154 to the second device 144 may enable the second device 144 to add the new category 122 to a corresponding natural language processing library stored at the second device 144. In a particular implementation, the second device 144 includes a mobile device, a smart speaker, a smart appliance, an IoT device, or another type of device.

In another particular implementation, the method 500 includes determining an emotion associated with the input audio data, associating the emotion with the new category label, and updating the one or more categories based on the new category label. For example, the processor 102 may determine the emotion 128 that is associated with the input audio data 114 and may associate the emotion 128 with the new category 122 in the natural language processing library 120. The method 500 may further include transmitting a notification of the emotion to the first device or to at least one device. For example, the notification 154 may include an indication of the emotion 128. The method 500 may also include determining a speaker category of the one or more categories associated with the speaker, associating the emotion with the speaker category, and updating the one or more categories based on the speaker category. For example, the processor 102 may determine a speaker indicated by the output text string 152 and an emotion associated with the speaker, and the processor 102 may update a corresponding category of the categories 121 of the natural language processing library 120. Additionally, or alternatively, the method 500 may include determining that the second input audio data matches the new category, determining an operation based on the emotion, and initiating performance of the operation. For example, the processor 102 may determine that second input audio data matches the new category 122 (e.g., based on a comparison of the second input audio data to the audio data 124) and thus the second input audio data is correlated with the emotion 128. Based on the emotion 128, the processor 102 may determine and initiate performance of an emotion-aware operation. For example, responsive to determining that the new category 122 correlates to sadness, the processor 102 may perform an operation, such as turning on music, that is associated with happiness.

Thus, the method 500 enables identification of new sounds for storage as new categories within a natural language processing library. As new categories are created, the new categories may be used to determine context of additional user commands. Determining context for natural language processing of user commands may improve the accuracy of the response to the user command in addition to enabling a user to give more natural user commands (e.g., commands that do not include as many contextual details), which improves a user experience.

Figure 6:
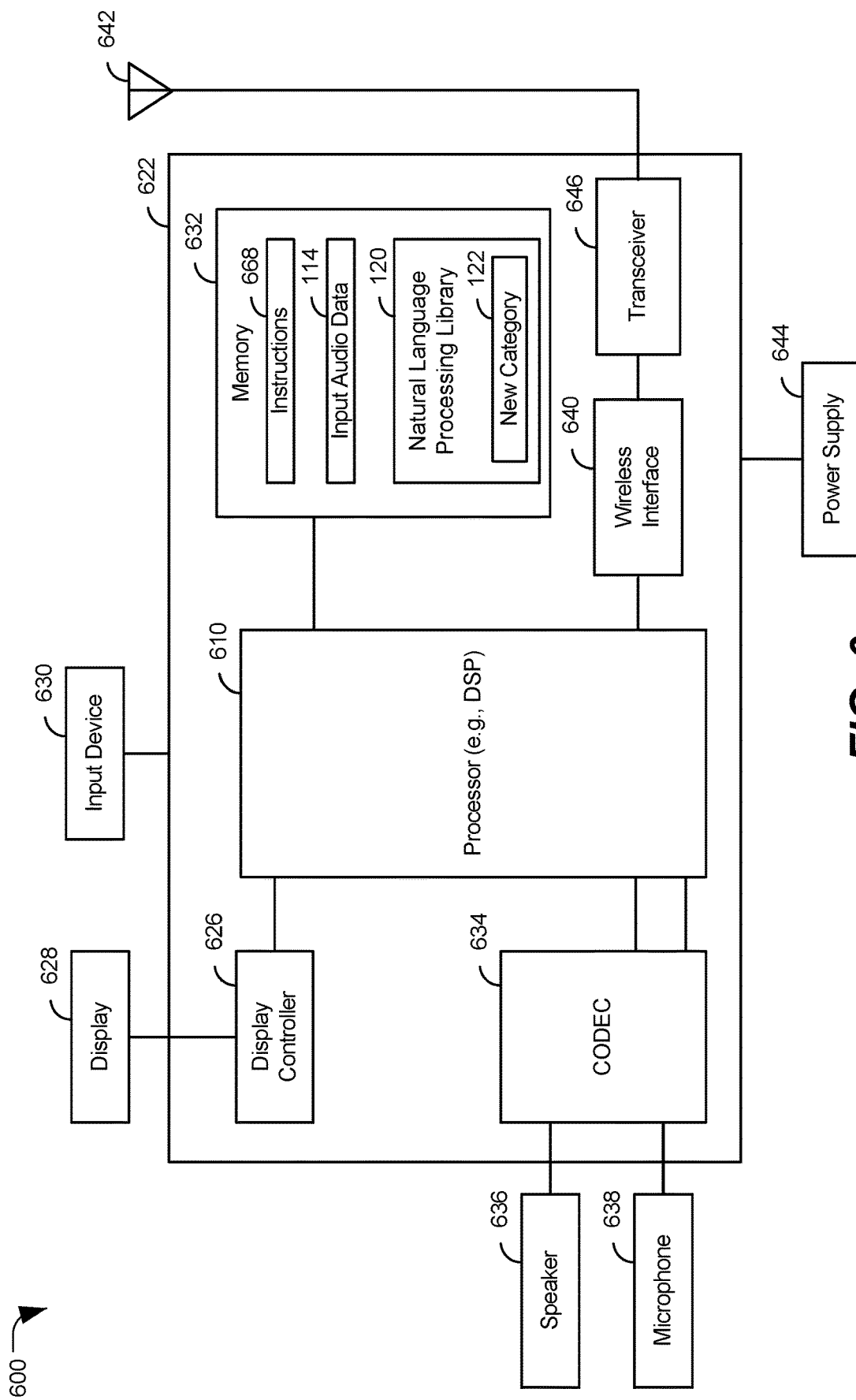
FIG. 6 is a block diagram of an aspect of a wireless device to perform audio analytics.

Referring to FIG. 6, a block diagram of a particular illustrative implementation of a device (e.g., a wireless communication device) is depicted and generally designated 600. In various implementations, the device 600 may have more or fewer components than illustrated in FIG. 6. In an illustrative aspect, the device 600 may perform one or more operations described with reference to systems and methods of FIGS. 1-5.

In a particular implementation, the device 600 includes a processor 610, such as a central processing unit (CPU) or a digital signal processor (DSP), coupled to a memory 632. The memory 632 includes instructions 668 (e.g., executable instructions) such as computer-readable instructions or processor-readable instructions. The instructions 668 may include one or more instructions that are executable by a computer, such as the processor 610. The memory 632 also includes the natural language processing library 120, which includes the new category 122, as described with reference to FIG. 1.

The device 600 may include a display controller 626 that is coupled to the processor 610 and to a display 628. A coder/decoder (CODEC) 634 may also be coupled to the processor 610. A speaker 636 and a microphone 638 may be coupled to the CODEC 634.

FIG. 6 also illustrates that a wireless interface 640, such as a wireless controller, and a transceiver 646 may be coupled to the processor 610 and to an antenna 642, such that wireless data received via the antenna 642, the transceiver 646, and the wireless interface 640 may be provided to the processor 610. In some implementations, the processor 610, the display controller 626, the memory 632, the CODEC 634, the wireless interface 640, and the transceiver 646 are included in a system-in-package or system-on-chip device 622. In some implementations, an input device 630 and a power supply 644 are coupled to the system-on-chip device 622. Moreover, in a particular implementation, as illustrated in FIG. 6, the display 628, the input device 630, the speaker 636, the microphone 638, the antenna 642, and the power supply 644 are external to the system-on-chip device 622. In a particular implementation, each of the display 628, the input device 630, the speaker 636, the microphone 638, the antenna 642, and the power supply 644 may be coupled to a component of the system-on-chip device 622, such as an interface or a controller.

In an illustrative implementation, the memory 632 includes or stores the instructions 668 (e.g., executable instructions), such as computer-readable instructions or processor-readable instructions. For example, the memory 632 may include or correspond to a non-transitory, computer readable medium storing the instructions 668. The instructions 668 may include one or more instructions that are executable by a computer, such as the processor 610.

In a particular implementation, the device 600 includes a non-transitory, computer readable medium (e.g., the memory 632) storing instructions (e.g., the instructions 668)

that, when executed by a processor (e.g., the processor 610), may cause the processor to perform operations including analyzing the input audio data 114 to generate a text string. The operations include performing natural language processing on at least the text string to generate an output text string comprising an action associated with at least one of a device, a speaker, a location, or a combination thereof. The operations include comparing the input audio data to audio data of one or more categories of the natural language processing library 120 to determine that the input audio data 114 matches any of the one or more categories. The operations include, in response to determining that the input audio data 114 does not match any of the one or more categories, creating a new category label (e.g., of the new category 122), associating the new category label with at least a portion of the output text string, updating the one or more categories with the new category label, and generating a notification indicating the new category label. In a particular implementation, the operations further include receiving multi-modal data, and the natural language processing is performed based further on one or more text strings based on the multi-modal data. The multi-modal data may include microphone proximity data, direction of arrival data, image data from a camera, position data from a position sensor, or a combination thereof.

The device 600 may include a wireless telephone, a mobile communication device, a mobile device, a mobile phone, a smart phone, a cellular phone, a laptop computer, a desktop computer, a computer, a tablet computer, a set top box, a personal digital assistant (PDA), a display device, a television, a gaming console, an augmented reality (AR) device, a virtual reality (VR) device, a music player, a radio, a video player, an entertainment unit, a communication device, a fixed location data unit, a personal media player, a digital video player, a digital video disc (DVD) player, a tuner, a camera, a navigation device, a decoder system, an encoder system, a vehicle, a component of a vehicle, or any combination thereof.

It should be noted that various functions performed by the one or more components of the systems described with reference to FIGS. 1, 2, 4 and the device 600 are described as being performed by certain components or circuitry. This division of components and circuitry is for illustration only. In an alternate aspect, a function performed by a particular component may be divided amongst multiple components. Moreover, in an alternate aspect, two or more components described with reference to FIGS. 1-6 may be integrated into a single component. Each component described with reference to FIGS. 1-6 may be implemented using hardware (e.g., a field-programmable gate array (FPGA) device, an application-specific integrated circuit (ASIC), a DSP, a controller, etc.), software (e.g., instructions executable by a processor), or any combination thereof.

In conjunction with the described aspects, an apparatus includes means for storing one or more category labels associated with one or more categories of a natural language processing library. The means for storing may include or correspond to the memory 104 of FIG. 1, the natural language processing library 206 of FIG. 2, the emotion/environment correlation library 410 of FIG. 4, the memory 632 of FIG. 6, one or more other structures or circuits configured to store one or more category labels associated with one or more categories of a natural language processing library, or any combination thereof.

The apparatus further includes means for processing. The means for processing is configured to analyze input audio data to generate a text string and to perform natural language processing on at least the text string to generate an output text string including an action associated with at least one of a first device, a speaker, a location, or a combination thereof. The means for processing is configured to compare the input audio data to audio data of one or more categories to determine whether the input audio data matches any of the one or more categories. The means for processing is further configured to, in response to determining that the input audio data does not match any of the one or more categories: create a new category label, associate the new category label with at least a portion of the output text string, update the one or more categories with the new category label, and generate a notification indicating the new category label. The means for processing may include or correspond to the processor 102 of FIG. 1, the inferencer 202, the acoustics detector 204, or the natural language processor 208 of FIG. 2, the processor 610 of FIG. 6, one or more other structures or circuits configured to perform the above-described operations, or any combination thereof.

In a particular implementation, the apparatus further includes means for displaying a graphical user interface that includes the notification. The means for displaying may include or correspond to the display device 108 of FIG. 1, the user interface 210 of FIG. 2, the user interface 416 of FIG. 4, the display 628 of FIG. 6, one or more other structures or circuits configured to display a graphical user interface that includes the notification, or any combination thereof. In a particular implementation, the apparatus includes means for transmitting the notification to one or more other devices and means for receiving one or more updated or new category labels from the one or more other devices. The means for transmitting may include or correspond to the transmitter 140 of FIG. 1, the wireless interface 640, the transceiver 646, or the antenna 642 of FIG. 6, one or more other structures or circuits configured to transmit a notification, or any combination thereof. The means for receiving may include or correspond to the receiver 142 of FIG. 1, the wireless interface 640, the transceiver 646, or the antenna 642 of FIG. 6, one or more other structures or circuits configured to receive one or more updated or new category labels, or any combination thereof.

One or more of the disclosed aspects may be implemented in a system or an apparatus, such as the device 600, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 600 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the device 600 may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

While FIG. 6 illustrates a wireless communication device including a processor configured to perform adaptive audio analytics, a processor configured to perform adaptive audio analytics may be included in various other electronic devices. For example, a processor configured to perform adaptive audio analytics as described with references to FIGS. 1-6, may be included in one or more components of a base station.

A base station may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA.

Various functions may be performed by one or more components of the base station, such as sending and receiving messages and data (e.g., audio data). The one or more components of the base station may include a processor (e.g., a CPU), a transcoder, a memory, a network connection, a media gateway, a demodulator, a transmission data processor, a receiver data processor, a transmission multiple input-multiple output (MIMO) processor, transmitters and receivers (e.g., transceivers), an array of antennas, or a combination thereof. The base station, or one or more of the components of the base station, may include a processor configured to perform adaptive audio analytics, as described above with reference to FIGS. 1-6.

During operation of a base station, one or more antennas of the base station may receive a data stream from a wireless device. A transceiver may receive the data stream from the one or more antennas and may provide the data stream to the demodulator. The demodulator may demodulate modulated signals of the data stream and provide demodulated data to the receiver data processor. The receiver data processor may extract audio data from the demodulated data and provide the extracted audio data to the processor.

The processor may provide the audio data to the transcoder for transcoding. The decoder of the transcoder may decode the audio data from a first format into decoded audio data and the encoder may encode the decoded audio data into a second format. In some implementations, the encoder may encode the audio data using a higher data rate (e.g., upconvert) or a lower data rate (e.g., downconvert) than received from the wireless device. In other implementations the audio data may not be transcoded. Transcoding operations (e.g., decoding and encoding) may be performed by multiple components of the base station. For example, decoding may be performed by the receiver data processor and encoding may be performed by the transmission data processor. In other implementations, the processor may provide the audio data to the media gateway for conversion to another transmission protocol, coding scheme, or both. The media gateway may provide the converted data to another base station or core network via the network connection.

Although one or more of FIGS. 1-6 may illustrate systems, apparatuses, and/or methods according to the teachings of the disclosure, the disclosure is not limited to these illustrated systems, apparatuses, and/or methods. One or more functions or components of any of FIGS. 1-6 as illustrated or described herein may be combined with one or more other portions of another of FIGS. 1-6. For example, one or more elements of the method 300 of FIG. 3 may be performed in combination with one or more elements of the method 500 of FIG. 5 or other operations described herein. Accordingly, no single implementation described herein should be construed as limiting and implementations of the disclosure may be suitably combined without departing form the teachings of the disclosure. As an example, one or more operations described with reference to FIGS. 1-6 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device for performing audio analytics, the device comprising:
a memory configured to store one or more category labels associated with one or more categories of a natural language processing library; and
a processor coupled to the memory and configured to:
analyze first input audio data to generate a first text string from a first portion of the first input audio data that represents speech;

perform natural language processing on at least the first text string to generate an output text string comprising an action associated with at least one of a first device, a speaker, a location, or a combination thereof;

in response to determining that a second portion of the first input audio data that represents sound distinct from the speech does not match audio data corresponding to any of the one or more categories:
  add a new category to the one or more categories, the new category including a new category label and the second portion of the first input audio data;
  associate the new category label with at least part of the output text string; and
  generate a notification indicating the new category label;

analyze second input audio data to generate a second text string from a first portion of the second input audio data that represents speech; and in response to determining that a second portion of the second input audio data corresponds to the new category, perform natural language processing on at least the second text string based on the at least part of the output text string.

2. The device of claim 1, further comprising a transmitter configured to transmit the notification to the first device.

3. The device of claim 1, further comprising a transmitter configured to transmit the notification to at least one device at the location associated with the output text string.

4. The device of claim 1, wherein the first device is at least one of a smart appliance, an Internet of Things (IoT) device, a mobile device, a smart speaker, a television, a vehicle, or a robot.

5. The device of claim 1, wherein the processor is further configured to, in response to the first input audio data matching a category label of the one or more category labels, perform additional natural language processing based on the category label.

6. The device of claim 1, wherein the processor is further configured to determine an operation based on the action and to initiate performance of the operation.

7. The device of claim 1, wherein the processor is further configured to:
  determine an emotion associated with the first input audio data;
  associate the emotion with the new category label; and
  update the one or more categories based on the new category label.

8. The device of claim 7, further comprising a transmitter configured to transmit the notification to the first device or to at least one device, the notification indicating the emotion.

9. The device of claim 7, wherein the processor is further configured to:
  determine a speaker category of the one or more categories associated with the speaker;
  associate the emotion with the speaker category; and
  update the one or more categories based on the speaker category.

10. The device of claim 7, wherein the processor is further configured to:
  determine that third input audio data matches the new category label;
  determine an operation based on the emotion; and
  initiate performance of the operation.

11. The device of claim 1, further comprising a receiver configured to receive a second notification indicating a second new category label and an associated second text string from at least one device associated with the second text string or located at a second location associated with the second text string.

12. The device of claim 1, further comprising a display device configured to display a graphical user interface (GUI) that includes the notification, wherein the notification comprises a visual notification.

13. The device of claim 12, wherein the processor is further configured to:
  receive an input indicative of a second text string; and
  associate the new category label with the second text string.

14. The device of claim 13, wherein the input corresponds to an input received via the GUI, a voice input, or a gesture.

15. The device of claim 1, wherein the notification comprises an audible notification.

16. The device of claim 1, wherein the notification comprises a haptic notification.

17. The device of claim 1, further comprising a microphone configured to receive the first input audio data.

18. The device of claim 1, further comprising a camera configured to capture image data associated with the first input audio data, wherein natural language processing is performed based further on one or more text strings based on the image data.

19. The device of claim 1, further comprising a comprising a position sensor configured to determine a position associated with the first input audio data, wherein the natural language processing is performed based further on one or more text strings and based on the position.

20. A method for performing audio analytics, the method comprising
  analyzing, at a processor, first input audio data to generate a first text string from a first portion of the first input audio data that represents speech;
  performing natural language processing on at least the first text string to generate an output text string comprising an action associated with at least one of a device, a speaker, a location, or a combination thereof;
  in response to a second portion of the first input audio data that represents sound distinct from the speech not matching audio data corresponding to any of one or more categories of a natural language processing library:
    adding a new category to the one or more categories, the new category including a new category label and the second portion of the first input audio data;
    associating the new category label with at least part of the output text string; and
    generating a notification indicating the new category label;
  analyzing second input audio data to generate a second text string from a first portion of the second input audio data that represents speech; and
  in response to a second portion of the second input audio data corresponding to the new category, performing natural language processing on at least the second text string based on the at least part of the output text string.

21. The method of claim 20, further comprising:
  determining an operation based on the action; and
  initiating performance of the operation.

22. The method of claim 21, wherein the operation comprises executing an application.

23. The method of claim 20, further comprising:
  analyzing third input audio data;

determining that the third input audio data matches input audio data of a particular category of the one or more categories; and performing second natural language processing on the third input audio data based on a particular label of the particular category.

24. The method of claim 20, further comprising determining a count of times that the first input audio data is identified, wherein the notification is generated based at least in part on the count satisfying a threshold.

25. An apparatus comprising:

means for storing one or more category labels associated with one or more categories of a natural language processing library; and means for processing, the means for processing configured to:

analyze first input audio data to generate a first text string from a first portion of the first input audio data that represents speech;

perform natural language processing on at least the first text string to generate an output text string comprising an action associated with at least one of a first device, a speaker, a location, or a combination thereof;

in response to determining that a second portion of the first input audio data that represents sound distinct from the speech does not match audio data corresponding to any of the one or more categories:

add a new category to the one or more categories, the new category including a new category label and the second portion of the first input audio data;

associate the new category label with at least part of the output text string; and generate a notification indicating the new category label;

analyze second input audio data to generate a second text string from a first portion of the second input audio data that represents speech; and in response to determining that a second portion of the second input audio data corresponds to the new category, perform natural language processing on at least the second text string based on the at least part of the output text string.

26. The apparatus of claim 25, further comprising means for displaying a graphical user interface that includes the notification, wherein the notification comprises a visual notification.

27. The apparatus of claim 25, further comprising:

means for transmitting the notification to one or more other devices; and means for receiving one or more updated or new category labels from the one or more other devices.

28. A non-transitory, computer readable medium storing instructions that, when executed by a processor, cause the processor to perform operations comprising:

analyzing first input audio data to generate a first text string from a first portion of the first input audio data that represents speech;

performing natural language processing on at least the first text string to generate an output text string comprising an action associated with at least one of a device, a speaker, a location, or a combination thereof;

in response to determining that a second portion of the first input audio data that represents sound distinct from the speech does not match audio data corresponding to any of one or more categories of a natural language processing library:

adding a new category to the one or more categories, the new category including a new category label and the second portion of the first input audio data;

associating the new category label with at least part of the output text string; and generating a notification indicating the new category label;

analyze second input audio data to generate a second text string from a first portion of the second input audio data that represents speech; and in response to determining that a second portion of the second input audio data corresponds to the new category, perform natural language processing on at least the second text string based on the at least part of the output text string.

29. The non-transitory, computer readable medium of claim 28, wherein the operations further comprise receiving multi-modal data, wherein the natural language processing is performed based further on one or more text strings based on the multi-modal data.

30. The non-transitory, computer readable medium of claim 29, wherein the multi-modal data comprises microphone proximity data, direction of arrival data, image data from a camera, position data from a position sensor, or a combination thereof.

* * * * *